(No Model.)

W. F. SPURGIN.
BED PAN.

No. 415,002. Patented Nov. 12, 1889.

WITNESSES:
C. W. Benjamin
A. S. Falls.

INVENTOR
William F. Spurgin
BY Arden S. Fitch
His ATTORNEY

UNITED STATES PATENT OFFICE.

WILLIAM F. SPURGIN, OF WEST POINT, NEW YORK.

BED-PAN.

SPECIFICATION forming part of Letters Patent No. 415,002, dated November 12, 1889.

Application filed August 21, 1889. Serial No. 321,451. (No model.)

*To all whom it may concern:*

Be it known that I, WILLIAM F. SPURGIN, residing at West Point, Orange county, State of New York, a citizen of the United States, have invented an Improved Bed-Pan, of which the following is a full, clear, and exact description, reference being had to the accompanying drawings, forming part of this specification.

My invention consists in the combination, in a bed-pan, with a bowl provided with a bottom inclined downwardly from rear to forward end and a top or seat having a longitudinal slot with forwardly-divergent side edges, of a chamber at and communicating with the forward end of said bowl and provided with a bottom inclined downwardly rearwardly to its juncture with said bowl-bottom, and side and front end walls extending above the bowl-seat, with the rearward edges of said side walls joined to the divergent edges of said seat-slot to constitute openings in the top and rearward side of said chamber, and also in the combination, with the described bed-pan, of a bridge-shield, as hereinafter set forth, extending laterally of the pan at the juncture of edges of the side walls of said chamber with the side edges of the seat-slot, whereby the advantages hereinafter specified are attained.

Figure 1:
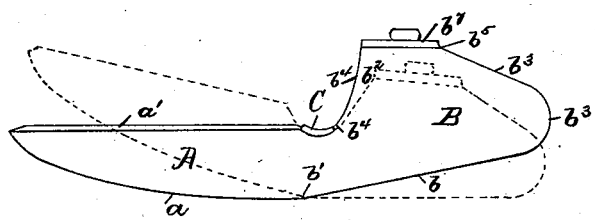
Figure 2:
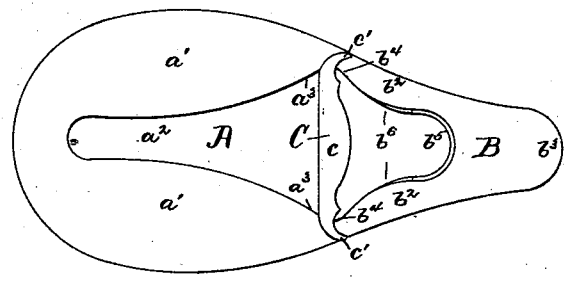
Figure 3:
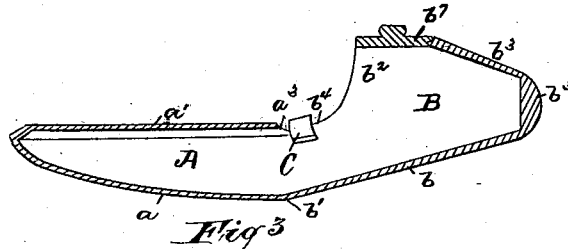
Figure 5:
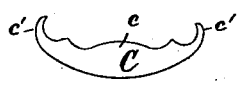
Figure 4:
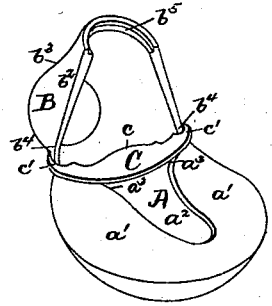

Figure 1 is a side elevation of a bed-pan containing my invention. Fig. 2 is a plan of the same. Fig. 3 is a vertical longitudinal section of the pan on line $x\ x$, Fig. 2. Fig. 4 is a rearward end elevation in perspective of the pan, and Fig. 5 is a plan in perspective of the bridge-shield detached.

A is a bowl, the bottom $a$ of which is inclined downwardly from the rearward to the forward end of the bowl, and said bowl has a seat or top $a'$, which is longitudinally slotted at $a^2$, with the side edges of the slot divergent from each other forwardly to about the bowl-rim at its forward end, as shown at $a^3$.

B is a chamber, which is connected to and has communication with the bowl A at the forward end of said bowl, the side walls of the chamber meeting those of the bowl, as shown, and the chamber being preferably integral with the bowl. The chamber B is provided with a bottom $b$, which is inclined downwardly from the front end of the chamber to its juncture with the bowl-bottom, as shown, thus constituting with said bowl-bottom an angle $b'$, external of the bottom of the completed pan. The side walls $b^2$ and front wall $b^3$ of the chamber extend upwardly above the line of the bowl-seat, as shown, and the rearward edges $b^4$ of said side walls meet and join the edges $a^3$, respectively, of the seat-slot $a^2$, as shown. The chamber B is thus open at its top, as shown at $b^5$, and at the rearward side between the walls $b^2$, as shown at $b^6$. The opening in the top may be furnished with a detachable lid $b^7$, if desired.

C is a bridge-piece adapted to reach across the slot $a^2$ at about the place where the edges thereof join the side walls of the chamber B. This bridge may be integral with the pan, but is preferably detachable, as shown, and is desirably wide at its central part, as at $c$, and provided at its ends with notches $c'$ to engage the pan-edges, as shown. It may with advantage be so formed that when in position on the pan its part $c$ will be inclined somewhat downwardly forwardly of the pan.

The advantages attained by my described bed-pan are that when a person is seated thereon the weight of the person will operate to tilt the pan downwardly forwardly on the bed, as shown in broken lines in Fig. 1, the said movement being facilitated by the external angle $b'$, so that the matter discharged into the bowl will pass directly into the chamber B, and that, while the described walls of the chamber B will constitute guards to prevent the discharge or escape into the bed of any matter, the opening $b^5$ in the top of the chamber and that between the side walls thereof at $b^6$ will permit convenient access to the seated parts of the person using the pan, and, furthermore, the bridge C will support the scrotum of a male person during use of the pan, and so prevent contact thereof with the matter discharged into the bowl. After use the pan may be conveniently emptied by discharging the contents of the chamber B through the opening $b^5$.

What I claim as my invention, and desire to secure by Letters Patent, is—

1. In a bed-pan, the combination, with the bowl A, having the bottom $a$, inclined downwardly from the rearward to forward end thereof, and a top or seat $a'$, provided with the longitudinal slot $a^2$, having forwardly-divergent side edges $a^3$, of the chamber B at and communicating with the forward end of said bowl and provided with a bottom $b$, inclined downwardly rearwardly to its juncture with the bowl-bottom, and side and front end walls $b^2 b^3$, extending upwardly above the line of the bowl-seat, with the rearward edges of said side walls joined to the divergent edges of said seat-slot and constituting openings $b^5$ and $b^6$ in the top and rearward side of said chamber, substantially as and for the purpose set forth.

2. In a bed-pan, the combination, with the bowl A, having the seat $a'$ and the slot $a^2$ therein, with forwardly-divergent side edges $a^3$, and the chamber B at and communicating with said bowl at the forward end thereof and having side and end walls $b^2 b^3$, extended above said bowl-seat, with the edges of said side walls joined to said divergent slot-edges, of the bridge C, adapted to extend laterally of the bowl at the juncture of said slot-edges with the edges of said side walls of said chamber, substantially as and for the purpose set forth.

WILLIAM F. SPURGIN.

Witnesses:
IRA T. NEWLANDS,
W. C. BURNS.